United States Patent
Bessho et al.

(10) Patent No.: US 9,333,690 B2
(45) Date of Patent: May 10, 2016

(54) METHOD FOR MANUFACTURING A FIBER-REINFORCED COMPOSITE MATERIAL

(75) Inventors: Masahiro Bessho, Tokyo (JP); Shiki Matsuo, Tokyo (JP); Wataru Nishimura, Tokyo (JP); Toshihiko Kariya, Nagoya (JP); Naoki Toda, Nagoya (JP)

(73) Assignee: MITSUBISHI HEAVY INDUSTRIES PLASTIC TECHNOLOGY, Nagoya-shi (JP)

( * ) Notice: Subject to any disclaimer, the term of this patent is extended or adjusted under 35 U.S.C. 154(b) by 0 days.

(21) Appl. No.: 13/392,729

(22) PCT Filed: Mar. 25, 2011

(86) PCT No.: PCT/JP2011/001770
§ 371 (c)(1),
(2), (4) Date: Apr. 18, 2012

(87) PCT Pub. No.: WO2011/118226
PCT Pub. Date: Sep. 29, 2011

(65) Prior Publication Data
US 2013/0001817 A1 Jan. 3, 2013

(30) Foreign Application Priority Data
Mar. 26, 2010 (JP) .................................. 2010-071388

(51) Int. Cl.
*B29C 45/56* (2006.01)
*B29C 45/14* (2006.01)
(Continued)

(52) U.S. Cl.
CPC ........... *B29C 45/561* (2013.01); *B29C 44/1209* (2013.01); *B29C 45/14631* (2013.01); *B29K 2105/0809* (2013.01)

(58) Field of Classification Search
CPC ............... B29C 70/682; B29C 70/688; B29C 2045/565; B29C 45/1705; B29C 2045/14286; B29C 70/68; B29C 45/56; B29C 70/04; B29C 70/78; B29C 43/18; B29C 70/10
USPC ........................................................ 264/45.3
See application file for complete search history.

(56) References Cited

U.S. PATENT DOCUMENTS 4,385,957 A * 5/1983 Wackerle et al. .......... 156/273.9
4,986,948 A * 1/1991 Komiya et al. ................ 264/257
(Continued)

FOREIGN PATENT DOCUMENTS

CA     2027741 A1    4/1991
CN     1744985 A      3/2006
(Continued)

OTHER PUBLICATIONS

Wang, et al., Research of thermal response simulation and mold structure optimization for rapid heat cycle molding processes, respectively, with steam heating and electric heating, Materials and Design, vol. 31 (2010), pp. 382-395.*

(Continued)

*Primary Examiner* — Matthew Daniels
(74) *Attorney, Agent, or Firm* — Westerman, Hattori, Daniels & Adrian, LLP

(57) ABSTRACT

A method for manufacturing a fiber-reinforced composite material of the present invention includes: the step (a) of placing a non-woven fabric N made of a reinforcement fiber in a movable mold 12; and the step (b) of moving the movable mold 12 toward a fixed mold 11 to close the mold and then injecting a thermoplastic resin into the mold to obtain a molded article formed of the non-woven fabric N and the thermoplastic resin. The mechanical strength of the obtained fiber-reinforced composite material can be enhanced by applying an injection compression molding process as the injection molding process in the step (b).

11 Claims, 8 Drawing Sheets

(51) Int. Cl.
  *B29C 44/12* (2006.01)
  *B29K 105/08* (2006.01)

(56) References Cited

U.S. PATENT DOCUMENTS

| | | | |
|---|---|---|---|
| 5,047,288 A * | 9/1991 | Hoshiro et al. | 428/219 |
| 5,283,113 A * | 2/1994 | Nishimura et al. | 442/320 |
| 5,308,570 A * | 5/1994 | Hara et al. | 264/255 |
| 5,558,883 A * | 9/1996 | Shinada et al. | 425/116 |
| 5,578,255 A * | 11/1996 | Okuyama et al. | 264/29.5 |
| 5,672,309 A * | 9/1997 | Masui et al. | 264/257 |
| 5,820,813 A * | 10/1998 | Hara et al. | 264/511 |
| 5,927,778 A * | 7/1999 | Uytterhaeghe et al. | 293/120 |
| 5,993,719 A * | 11/1999 | Abe et al. | 264/257 |
| 6,129,870 A * | 10/2000 | Hettinga | 264/40.5 |
| 6,165,396 A * | 12/2000 | Sato et al. | 264/45.3 |
| 6,296,799 B1 * | 10/2001 | Sato et al. | 264/259 |
| 6,419,862 B2 * | 7/2002 | Funakoshi | 264/45.3 |
| 6,572,808 B1 * | 6/2003 | Saito et al. | 264/261 |
| 6,660,195 B2 * | 12/2003 | Usui et al. | 264/46.4 |
| 6,893,587 B2 * | 5/2005 | Murakoshi et al. | 264/45.5 |
| 7,175,796 B2 * | 2/2007 | Ehnert | 264/257 |
| 7,767,302 B2 * | 8/2010 | Hirata et al. | 428/408 |
| 7,833,445 B2 * | 11/2010 | Harada et al. | 264/50 |
| 2007/0122687 A1 * | 5/2007 | Sakurai et al. | 429/42 |
| 2007/0187872 A1 | 8/2007 | Besold | |
| 2008/0185755 A1 * | 8/2008 | Deaville et al. | 264/257 |
| 2010/0260980 A1 * | 10/2010 | Schirmer | 428/201 |
| 2011/0143110 A1 * | 6/2011 | Tsuchiya et al. | 428/213 |

FOREIGN PATENT DOCUMENTS

| | | |
|---|---|---|
| CN | 101044003 A | 9/2007 |
| GB | 2323322 A | 9/1998 |
| JP | 60-44328 A | 3/1985 |
| JP | 1-285316 A | 11/1989 |
| JP | 3-130118 A | 6/1991 |
| JP | 6-15687 A | 1/1994 |
| JP | 10-217274 A | 8/1998 |
| JP | 10-337755 A | 12/1998 |
| JP | 11-34105 A | 2/1999 |
| JP | 11-77737 A | 3/1999 |
| JP | 2001-179750 A | 7/2001 |
| JP | 2001-293746 A | 10/2001 |
| JP | 2002-371141 A | 12/2002 |
| JP | 2007-182025 A | 7/2007 |
| JP | 2008-50447 A | 3/2008 |
| JP | 2009-51080 A | 3/2009 |
| WO | 95/17290 A1 | 6/1995 |
| WO | WO2010013645 * | 2/2010 |

OTHER PUBLICATIONS

Han, et al., Analysis of an Injection/Commpression Liquid Composite Molding Process, Polymer Composites, vol. 19, No. 4 (1998), pp. 487-496.*

Bickerton, S. and M.Z. Abdullah, Modeling and evaluation of the filling stage of injection/compression moulding, Composites Science and Technology, vol. 63 (2003), pp. 1359-1375.*

Tanaka, K, M. Yamada, N. Kohashi, T. Katayama, High-speed compression moulding of CFRTP/AFRTP hybrid composites using an electromagnetic induction heating system, WIT Transactions on the Built Environment, vol. 112 (2010), pp. 141-151.*

Notification of Transmittal of Translation of the International Preliminary Report on Patentability (Form PCT/IB/338) of International Application No. PCT/JP2011/001770 (1 page) mailed Nov. 1, 2012 with Forms PCT/IB/373 (1 page) and PCT/ISA/237 (6 pages).

International Search Report of PCT/JP2011/001770, mailing date of Jun. 28, 2011.

Chinese Office Action dated Oct. 9, 2013, issued in corresponding Chinese Patent Application No. 201180003012.4, w/ English translation.

Japanese Office Action dated May 7, 2014 issued in corresponding Japanese Patent Application No. 2012-506861, w/English translation (7 pages).

Chinese Office Action dated Apr. 29, 2014, issued in corresponding Chinese Patent Application No. 201180003012.4 with Partial English translation (10 pages).

* cited by examiner

METHOD FOR MANUFACTURING A FIBER-REINFORCED COMPOSITE MATERIAL

TECHNICAL FIELD

The present invention relates to a method for manufacturing a material formed by complexing a non-woven fabric constituted by a reinforcement fiber with a thermoplastic resin.

BACKGROUND ART

A carbon material is increasingly used for automobile parts in order to save weight, and a composite material is well known which is formed of a woven sheet including a reinforcement fiber such as a carbon fiber and a thermoplastic resin. For instance, Patent Document 1 discloses a method for molding a woven decorative resin product which is excellent in strength, design characteristics and moldability. The resin product is formed by laminating a woven sheet made of a carbon fiber and/or a synthetic fiber in a transparent or a semi-transparent thermoplastic resin and making the woven sheet contain the thermoplastic resin. The thermoplastic resin is more effective in shortening a molding tact time in comparison with a thermosetting resin. However, the melt has high viscosity, accordingly, the speed of being impregnated into the woven sheet is extremely slow, and the thermoplastic resin cannot shorten the molding cycle as a whole.

Accordingly, the thermosetting resin with low viscosity has been used previously as a resin for being impregnated into the woven sheet by injection, but is limited to comparatively expensive applications including those for automobiles.

CITATION LIST

Patent Literature

Patent Document 1

Patent Document 1: Japanese Patent Laid-Open No. 2009-51080

SUMMARY OF INVENTION

Technical Problem

Unlike the technology for impregnating the woven sheet with the thermoplastic resin as in Patent Document 1, a technology is known, which injection-molds a resin by using a pellet formed of a thermoplastic resin containing a reinforcement fiber. However, in this method, the contained reinforcement fiber is broken by receiving a high shearing force in a screw, when having been injection-molded, particularly in a plasticizing process of melting the pellet. For this reason, the fiber length of the reinforcement fiber becomes extremely shorter in a molded article which has been formed by injection molding than in the pellet state. Therefore, the fiber-reinforced composite material using the thermoplastic resin in this method has lower mechanical strength than that of a composite material using a woven sheet which is a continuous fiber, and accordingly the application has been limited.

The present invention has been devised in view of such technological problems, and an object of the present invention is to enhance a mechanical strength of a fiber-reinforced composite material using a thermoplastic resin while shortening the cycle time of the injection molding process.

Solution to Problem

The method for manufacturing the fiber-reinforced composite material according to the present invention, which has been devised for such an object, includes: a step (a) of placing a non-woven fabric formed of a reinforcement fiber in a mold; and a step (b) of injecting a thermoplastic resin into the mold to obtain a molded article formed of the non-woven fabric and the thermoplastic resin, wherein an injection compression molding process is conducted as the injection molding process in the step (b).

The method for manufacturing the fiber-reinforced composite material according to the present invention includes injection-molding the thermoplastic resin to the non-woven fabric made of the reinforcement fiber. The non-woven fabric is easily impregnated with the melted thermoplastic resin because of having more gaps among fibers compared to the woven sheet, and accordingly has a larger contact area between the reinforcement fiber and the resin, in comparison with the case in which the melted thermoplastic resin is injection-molded to the woven sheet. As a result, the molded article can develop high strength. In addition, according to the method of injecting the thermoplastic resin to the non-woven fabric, the length of the reinforcement fiber can be kept long even after having been molded, in comparison with the method using the pellet containing the reinforcement fiber. This is because the reinforcement fiber receives a high shearing force in a screw in the latter case, but in contrast to this, the non-woven fabric is placed in the mold in the case of the present invention, accordingly the reinforcement fiber does not exist in the screw and the non-woven fabric does not receive the shearing force.

The present invention has an effect of reducing breakage of a reinforcement fiber constituting the non-woven fabric, in comparison with the method using the pellet containing the reinforcement fiber. In order to make this effect more remarkable, the injection compression molding process is conducted as the injection molding process in the step (b). The injection compression molding process has a feature of showing a low pressure during an injection operation, but such a new effect has been found due to the present invention that the injection compression molding process reduces breakage of the reinforcement fiber.

In the method for manufacturing the fiber-reinforced composite material according to the present invention, it is preferable to heat the mold or the non-woven fabric in the step (a), and then conduct the injection molding in the step (b). In order to enhance the mechanical strength of the fiber-reinforced composite material to be obtained according to the present invention, it is desirable to enhance the affinity, wettability and adhesiveness of a fiber constituting the non-woven fabric for a thermoplastic resin, when the resin is injected. For this purpose, it is recommended in the present invention to heat the mold or the non-woven fabric before starting the injection operation.

In addition, in the method for manufacturing the fiber-reinforced composite material according to the present invention, it is preferable to heat at least one part of the mold in the step (a), and then conduct the injection molding in the step (b). If a movable mold is heated in a state in which the non-woven fabric is arranged in the inner part of the movable mold, for instance, it can be suppressed that heat is absorbed by the mold or the non-woven fabric and the viscosity of the resin rises, when a melted high-temperature resin which has been injected to and fills the mold has come in contact with the mold or the non-woven fabric. Thereby, the affinity and the wettability of the fiber constituting the non-woven fabric for the thermoplastic resin are enhanced, the melted resin is promoted to penetrate the gaps among the fibers of the non-woven fabric, the adhesiveness between the resin and the fiber is enhanced, and the mechanical strength of the fiber-reinforced composite material obtained by the injection compression molding is enhanced. On the other hand, when a fixed mold is heated in a state in which the non-woven fabric is arranged in the inner part of the movable mold, an inlet passage for the resin formed in the fixed mold and a fixed die plate is also heated. Thereby, the flowability of the thermoplastic resin is enhanced when the thermoplastic resin has entered the inner part of the mold cavity compared to the case in which the flow channel of the resin is not heated; a shearing force is reduced, which is imposed onto the non-woven fabric by the resin, when the non-woven fabric has come in contact with the thermoplastic resin; and the peeling and scattering of the fiber in the non-woven fabric, breakage of the fiber resulting from the scattering, and the variation of the thickness of a molded article can be reduced. Also when only one of the movable mold and the fixed mold which constitute the mold is heated, the effect as described above is obtained. Accordingly, the present invention includes not only an aspect of heating the whole mold but also an aspect of heating at least one part of the mold. In addition, the mold to be heated may be only a mold on which the non-woven fabric has been placed, may also be only a mold opposing to the mold on which the non-woven fabric has been placed, or may also be both of the mold on which the non-woven fabric has been placed and the mold opposing to the mold on which the non-woven fabric has been placed. When the mold on which the non-woven fabric is placed is heated, the non-woven fabric which comes in contact with the mold can also be heated together with the mold, which is effective to obtain the above described effect. In such the case in which the mold for placing the non-woven fabric thereon has a special structure in order to place the non-woven fabric thereon, and in which it is hard to provide a special structure for heating the mold therein, the structure for heating may also be provided only in the mold on which the non-woven fabric is not placed. In this case, not only the surface of the cavity of the mold opposing to the non-woven fabric is heated but also the non-woven fabric can be heated by radiant heat emitted from the mold opposing to the non-woven fabric.

In addition, when a malfunction of molding such as warpage has occurred in an molded article due to the adherence of the resin and the non-woven fabric in the molded article which have different shrinkage degrees from each other when cooled, the mold in the side on which the non-woven fabric has been placed or the mold in the side on which the non-woven fabric is not placed may also be heated at high temperature so that temperatures are different from each other or may also be heated so that the heating speeds are different from each other, in order to give different surface temperatures of cavities between the side to have no non-woven fabric thereon and the side to have the non-woven fabric thereon. In this case, the shrinkage amounts or the shrinkage speeds of the resin when solidified can be individually controlled on the surface of the molded article in the side to have the non-woven fabric and on the surface of the molded article in the side to have no non-woven fabric, accordingly which is effective for solving the malfunction of the warpage of the molded article.

Further to say, the portion to be heated may be only a portion on which the non-woven fabric has been placed, may also be only a portion on which the non-woven fabric is not placed, or may also be the whole cavity regardless of whether the non-woven fabric is placed on the portion or not. In this case, it is preferable that the portion to be heated includes the more upstream side of an injection filling stream than the portion on which the non-woven fabric has been placed, for keeping the temperature of the resin which comes in contact with the non-woven fabric at high temperature.

Furthermore, it is also allowed to divide the portion to be heated into a plurality of blocks, and heat the blocks so as to have a temperature difference among each portion, or to heat each block with a time difference in order or at random. In addition, in a cooling method after heating, it is also allowed to independently control the cooling timing or the cooling speed of the fixed mold or the movable mold; the mold in the side on which the non-woven fabric has been placed or the mold in the side on which the non-woven fabric is not placed; or each heated block, similarly to the heating method.

As described above, the heating method and the cooling method are not limited to the above described methods, and the mold or the non-woven fabric may also be heated or cooled by any method.

In the present invention, it is also preferable to apply an injection foaming molding process for the injection molding process in the step (b), as another means of enhancing the affinity of the thermoplastic resin for the fiber constituting the non-woven fabric. At this time, it is also allowed to combine the injection foaming molding process with heating the mold or the non-woven fabric.

In the present invention, the reinforcement fiber constituting the non-woven fabric preferably includes a carbon fiber or a glass fiber, and most preferably includes the carbon fiber.

Advantageous Effects of Invention

According to the method for manufacturing the fiber-reinforced composite material of the present invention, a non-woven fabric is more easily impregnated with a melted thermoplastic resin in comparison with a woven sheet; accordingly, a contact area between the reinforcement fiber and the resin increases compared to the case in which the melted thermoplastic resin is injection-molded to the woven sheet; the length of the reinforcement fiber after having been molded can be kept long in comparison with a conventional fiber-reinforced composite material obtained by injection molding the pellet containing the reinforcement fiber; and the molded article can show high mechanical strength.

BRIEF DESCRIPTION OF DRAWINGS

FIGS. 2A and 2B are views illustrating a mold in an opened (standby) state; and FIG. 2C is a view illustrating a mold in a closed state. In addition, FIG. 2A is a cross section when viewed from the arrow A to A in FIG. 2B; FIG. 2B is a plan view of a movable mold, when viewed from a cavity side; and FIG. 2C is a sectional view in the same portion as that of FIG. 2A.

DESCRIPTION OF EMBODIMENTS

Figure 1:
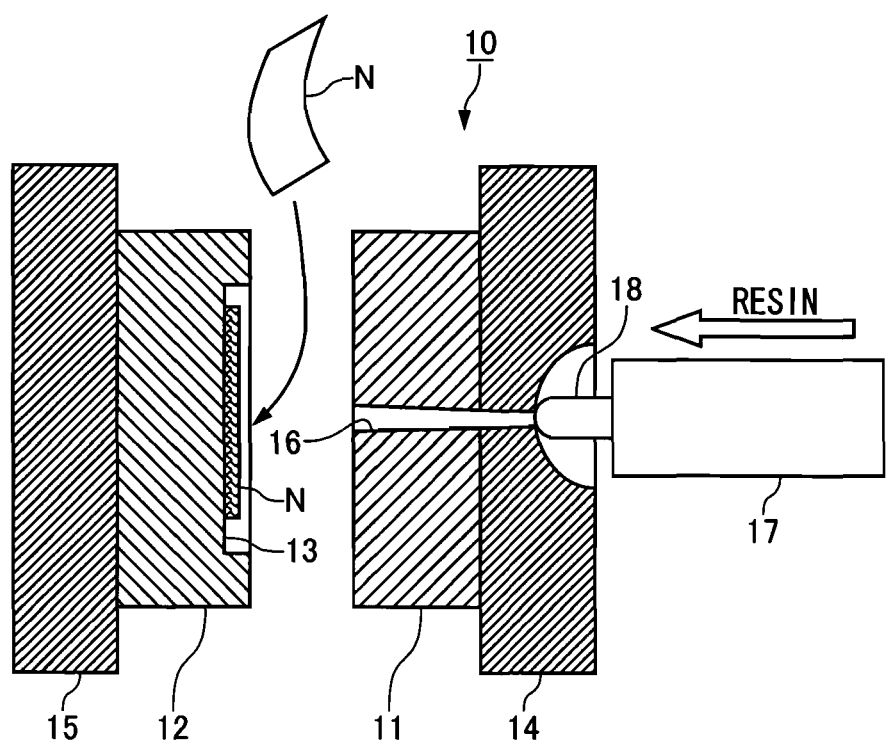
FIG. 1 is a sectional view illustrating an outline of a main part of an injection molding machine.

The method for manufacturing the fiber-reinforced composite material according to the present invention includes: the step (a) of placing a non-woven fabric made of a reinforcement fiber in a mold; and the step (b) of injecting a thermoplastic resin into the mold to obtain a molded article formed of the non-woven fabric and the thermoplastic resin. The fiber-reinforced composite material to be manufactured according to the present invention will be described below, and then embodiments will be described with reference to the drawings in the order of the step (a) and the step (b).

[Fiber-Reinforced Composite Material]

The fiber-reinforced composite material according to the present invention is formed of a non-woven fabric made of a reinforcement fiber (hereinafter referred to simply as non-woven fabric) and a thermoplastic resin. The fiber-reinforced composite material is a material obtained by injection-molding the thermoplastic resin to the non-woven fabric, as will be described later. The non-woven fabric means a sheet-shaped cloth in which the fibers are entangled without being woven, as is well known, and has a large number of voids existing in the inner part thereof, which communicate with the outside. When the melted thermoplastic resin is injection-molded, the melted thermoplastic resin penetrates the non-woven fabric and fills the inside of the voids in the non-woven fabric, which enhances the mechanical strength of the thermoplastic resin that may be called as a matrix of the fiber-reinforced composite material. The reason why the present invention uses the non-woven fabric is because the thermoplastic resin more easily penetrates the inner part of the non-woven fabric by injection molding, in comparison with the woven sheet, and the non-woven fabric does not show the orientation dependency of strength properties because of having fibers orient indefinite directions. In order to sufficiently enhance the mechanical strength, it is important to sufficiently secure the penetrability of the thermoplastic resin into the non-woven fabric and the affinity of the non-woven fabric for the thermoplastic resin. As will be described later, the manufacturing method according to the present invention also provides means which particularly copes with this point.

Because the thermoplastic resin fills the inside of the voids of the non-woven fabric, a ratio of the thermoplastic resin occupying in the fiber-reinforced composite material becomes smaller than that of the non-woven fabric. In the extent, when the ratio of the thermoplastic resin occupying in the fiber-reinforced composite material is extremely small (the ratio of the non-woven fabric is extremely large), there is the case in which the voids cannot be sufficiently filled with the thermoplastic resin and the affinity cannot be sufficiently secured. In addition, when the ratio of the thermoplastic resin occupying in the fiber-reinforced composite material is extremely large (the ratio of the non-woven fabric is extremely small), portions which are not reinforced by the non-woven fabric increase, and accordingly an effect of enhancing strength may not be sufficiently obtained. From the above viewpoints, a volume ratio of the non-woven fabric with respect to the thermoplastic resin is preferably controlled to approximately 10 to 60%. For information, the volume of the non-woven fabric described here shall not include portions of the voids.

<Non-Woven Fabric>

The non-woven fabric to be used in the present invention is constituted by a reinforcement fiber. The usable reinforcement fiber includes a carbon fiber, a glass fiber, a boron fiber and an aramid fiber. Among them, the carbon fiber and the glass fiber are preferably used. Incidentally, the carbon fiber means a fibrous substance which is formed by carbonizing an organic fiber and has a carbonization degree of 90 to 98% or more, as is well known, but the present invention does not consider the specific material of the carbon fiber. In addition, the glass fiber means a material which is formed by melting a glass which contains a silicate as a main component and processing the glass into a fibrous shape, as is well known, but the present invention does not consider the specific material of the glass fiber as well.

The size of the reinforcement fiber is not limited in particular, but a gauge (diameter, hereafter the same) of the fiber is preferably selected from a range of 1 to 20 μm, the length of the fiber is preferably selected from a range of 3 to 100 mm, and the aspect ratio is preferably set at 100 or more. When the fiber gauge is extremely small, handling in a step of manufacturing the non-woven fabric is difficult, breakage or the like easily occurs, and the cost becomes remarkably high. When the fiber gauge is extremely large, the contact area between the reinforcement fiber and the thermoplastic resin is reduced, and accordingly the molded article results in being incapable of developing a desired strength. When the fiber length is extremely short, the strength is lowered, and when the fiber length is extremely long, the length becomes a cause of increase in a cost. In addition, the gauge and the length of the reinforcement fiber constituting the non-woven fabric do not necessarily need to be one type, but the non-woven fabric may also be constituted by the combination of a plurality of types (gauge and length) of fibers.

The basis weight (amount of fiber per unit area) of the non-woven fabric is not limited in particular, but is preferably selected from a range of 40 to 500 g/m$^2$. When the basis weight is extremely small, the molded article results in not showing required strength properties. On the other hand, when the basis weight is extremely large, the weight increases and the penetrability of the resin into the gaps among the fibers of the reinforcement fiber is aggravated.

The non-woven fabric to be used in the present invention is not limited to a non-woven fabric having the uniform basis weight in a thickness direction, but the basis weight can be made non-uniform. For instance, by setting the basis weights of both front and back layers so as to be larger than that of a middle layer, the bending rigidity of the fiber-reinforced composite material can be enhanced. For instance, suppose that the basis weights of the both front and back layers are set at 100 g/m$^2$, and the basis weight of the middle layer is set at 20 g/m$^2$. By thus inclining the basis weight, the amount of the fiber in the middle layer necessary for obtaining the required mechanical strength can be set at a necessary minimum value, and accordingly increases in the cost and the weight can be suppressed. It is also possible to manufacture the fiber-reinforced composite material having different physical properties such as rigidity in front and back sides, by setting the basis weight in one side in the thickness direction of the non-woven fabric so as to be large and the basis weight in the other side so as to be small. In addition, such a control for inclining the basis weight can be realized, of course, not only in a sheet of the non-woven fabric, but also by stacking a plurality of sheets of the non-woven fabric.

<Thermoplastic Resin>

The thermoplastic resin to be used in the present invention may be selected from known materials which include: polyolefin; a polyacrylate-based polymer such as polymethacrylate and polymethyl methacrylate; polystyrene; polycarbonate; polyarylate; polyester carbonate; polysulfone; polyimide; and polyether imide.

The thermoplastic resin of a raw material is not limited to the case of a thermoplastic resin constituted only by a resin, but may also employ a thermoplastic resin containing a reinforcement fiber. For instance, a pellet containing the reinforcement fiber may also be mixed with the thermoplastic resin, or only the pellet containing the reinforcement fiber may also be used as the raw material.

[Injection Molding Step (a)]

FIG. 1 illustrates an outline of a main part of an injection molding machine 10. As in the figure, the injection molding machine 10 has a fixed mold 11 attached to a fixed die plate 14, and a movable mold 12 opposing to the fixed mold 11 attached to a movable die plate 15. The movable mold 12 has a cavity 13 provided in a side of the face opposing to the fixed mold 11. An injection cylinder 17 provided with a nozzle 18 that abuts on an entrance of an inlet passage 16 for the resin, which is formed in the fixed mold 11 and in the fixed die plate 14, is arranged in a rear side of the fixed mold 11.

Before starting an injection molding operation, a non-woven fabric N made of a reinforcement fiber is placed at a predetermined position in the cavity 13 of the movable mold 12. It is necessary for the non-woven fabric N placed at the predetermined position to be fixed at the position so as not to be deviated from the position when the mold is closed or in the midst of the injection molding operation. It is considered as a method for fixing the non-woven fabric N to stick the non-woven fabric onto the mold by using an adhesive or to vacuum-draw the non-woven fabric N through a vent hole provided in the mold. In addition, it is also possible to fix the non-woven fabric N onto the position by making a pin which projects in the cavity of the mold penetrate the non-woven fabric. The method for fixing the non-woven fabric N with the pin will be described below with reference to FIG. 2. However, the method for fixing the non-woven fabric N illustrated in FIG. 2 is just one example, and it goes without saying that other techniques may be adopted.

Figure 2A:
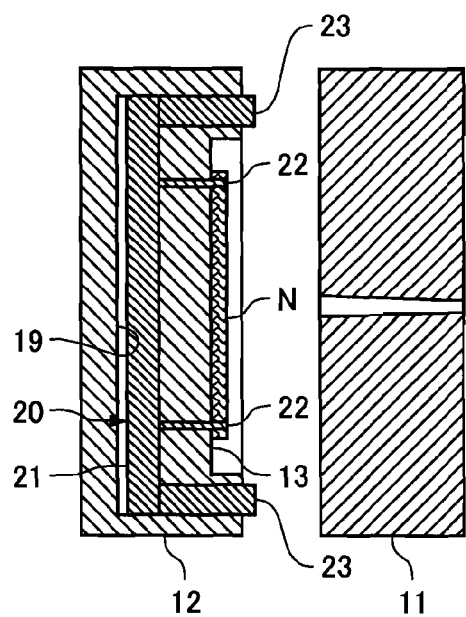
FIGS. 2A to 2C are views illustrating a method of fixing a non-woven fabric by making a pin projecting on the inner part of a mold cavity pass through the non-woven fabric.
Figure 2B:
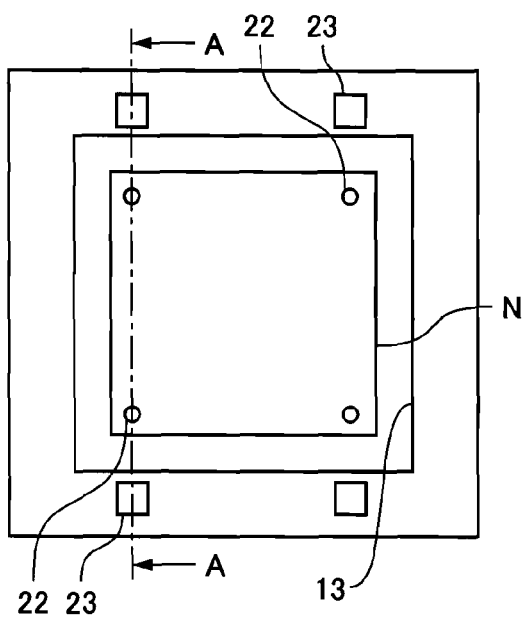
Figure 2C:
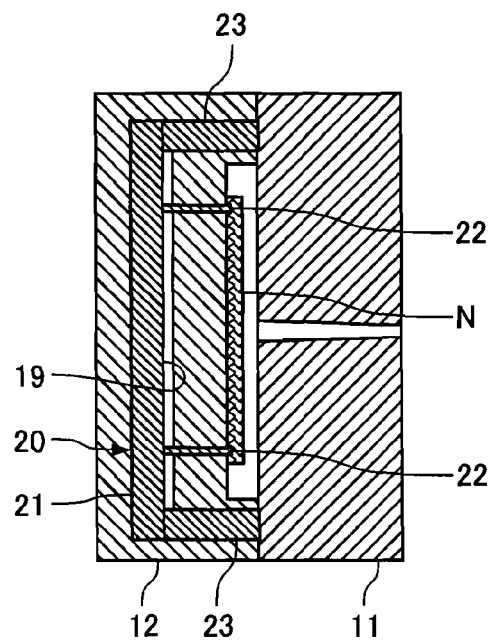

As is illustrated in FIGS. 2A to 2C, the movable mold 12 is provided with a fixing mechanism 20 for fixing the non-woven fabric N onto a predetermined position of the cavity 13. The fixing mechanism 20 is accommodated in an accommodation space 19 which is provided in the inner part of the movable mold 12, so as to be reciprocatable in forward and backward directions (in moving direction of the movable mold 12). The fixing mechanism 20 is constituted by a tabular base 21, four fixing pins 22 provided so as to rise from the base 21, and an actuating column 23 provided so as to rise from the four corners of the base 21. In a stand-by state illustrated in FIGS. 2A and 2B, the fixing mechanism 20 protrudes toward the cavity 13 so that the tips of the fixing pins 22 can penetrate the non-woven fabric N, and the tip of the actuating column 23 protrudes from the front end face of the movable mold 12. In this stand-by state, the four fixing pins 22 pierce the non-woven fabric N to thereby position the non-woven fabric N in the cavity 13.

After the non-woven fabric N has been positioned, the mold is closed so that the movable mold 12 faces toward the fixed mold 11. When the movable mold 12 is made to advance to such an injection position that the front end face of the movable mold 12 comes in contact with the fixed mold 11, the tip of the actuating column 23 comes in contact with the fixed mold 11, and thereby the fixing mechanism 20 is pushed backward. Along with this operation, the fixing pins 22 retract to such a degree that the tips of the fixing pins 22 slightly pierce the non-woven fabric N. When the mold has been set in this state, the injection molding operation is started.

[Injection Molding Step (b)]

The thermoplastic resin may be basically injected according to a usual method, but it is recommended in the present invention to employ an injection compression molding process.

<Injection Compression Molding>

The injection compression molding process is a method of conducting an injection operation with a mold opening device or with the pressure of the resin in the mold, in such a state that the mold is opened only by a predetermined amount e of opening in the mold necessary for injection compression; and moving the movable mold 12 toward the fixed mold 11 only by the amount e of opening in a period between the start of the injection operation and the end of the injection operation to thereby compress a melted and plasticized resin in the cavity 13. The injection compression molding process slightly expands the cavity when the resin is injected, reasonably fills the cavity with the resin, then applies a pressure to a molded article, and accordingly progressively uniformizes the pressure in the mold; and is evaluated to provide a molded article which has little distortion and no warpage and shrinkage. It has been found out through the present invention that an effect different from a conventionally known effect is shown when the injection compression molding process is applied to the non-woven fabric. This effect will become clear specifically in the first Example which will be described later, but in the injection compression molding process, the pressure of the resin is low when the resin is injected (for instance, 2 to 50 MPa, preferably 2 to 30 MPa, and further preferably 2 to 20 MPa), which can suppress breakage of the reinforcement fiber constituting the non-woven fabric when the resin is injected. In the injection compression molding process, a pressure difference between the upstream (gate part) in a flow direction of the resin and an end part of the cavity is small (for instance, 30 MPa or less, preferably 20 MPa or less, and further preferably 10 MPa or less), and accordingly, the pressure of the resin can be increased in the end part of the cavity as well. As the result, the osmotic pressure of the resin can be increased in the end part of the non-woven fabric as well, and adhesiveness between the resin and the carbon fiber can be enhanced. It is extremely important for securing the mechanical strength of the fiber-reinforced composite material to have newly found this effect.

According to the investigation of the present inventors, a variation of the thickness of the obtained fiber-reinforced composite material varies according to the amount of compression in the injection compression molding process. In addition, breakage occurs in the reinforcement fibers constituting the non-woven fabric due to the injection of the resin as previously described, but the fiber length after having been molded with respect to an initial fiber length varies according to the amount of compression in the injection compression molding process. As will be shown in the first Example which will be described later, the variation of the thickness of the composite material increases as the amount of compression increases, and on the other hand, the lengths of the fibers after having been injected show a peak when the amount of compression is 2 mm. From the above description, when the injection compression molding process is applied to the present invention, the amount of compression is preferably set at approximately 1 to 3 mm.

In addition, as the compression speed of the injection compression molding is slower, the fiber length after having been molded tends to be longer, but when the cycle time of the injection molding process is also considered, the compression speed is preferably set in a range of 5 to 15 mm/sec.

<Preheating (Heating)>

In order to enhance the mechanical strength of the fiber-reinforced composite material, the penetrability of the thermoplastic resin into the non-woven fabric and the affinity and the wettability of the fiber constituting the non-woven fabric for the thermoplastic resin are preferably enhanced when the resin is injected. The penetrability described here means that the melted thermoplastic resin penetrates the voids in the non-woven fabric, and the affinity means that the resin which has penetrated fits the fiber. In addition, the wettability is a word similar to the above described affinity, but when having been evaluated by the size of the contact angle formed by the resin and the surface of the fiber and having shown a small contact angle, the wettability is evaluated to be high. For that purpose, it is preferable in the present invention to heat the non-woven fabric or the mold before starting the injection operation. This heating is called preheating.

The temperature of the preheating is desirably selected from a range of a melting point of the thermoplastic resin to be used or higher according to the melting point thereof, but an effect also can be obtained in the case of setting the temperature at the melting point or lower. Heating temperatures will be exemplified below on some thermoplastic resins. The heating temperature for PET (polyethylene terephthalate) having a melting point of approximately 255±10° C. is preferably 120° C. or higher, and more preferably is 170° C. or higher. The heating temperature for PA6 (polyamide 6) having a melting point of approximately 210±5° C. is preferably 100° C. or higher, and more preferably is 130° C. or higher. The heating temperature for PP (polypropylene) having a melting point of approximately 165±10° C. is preferably 80° C. or higher, and more preferably is 100° C. or higher.

The non-woven fabric is preferably preheated in a state of being placed at the predetermined position of the mold, but also a non-woven fabric which has been preheated in the outside of the injection molding machine can be placed at the predetermined position of the mold. However, the non-woven fabric is preferably preheated in a state of being placed on the mold, because when the non-woven fabric is preheated outside, there are such limitations for the non-woven fabric that the preheated non-woven fabric needs to be kept warm so as to avoid the lowering of its temperature and a facility for preheating the non-woven fabric is separately needed.

In order to preheat the non-woven fabric in such a state that the non-woven fabric is placed on the mold, it is possible, for instance, to blow a hot air to the non-woven fabric or the mold. In addition, when a reinforcement fiber constituting the non-woven fabric is a carbon fiber, it is possible to induction-heat the non-woven fabric by passing an eddy current through the non-woven fabric, and resistance-heat the non-woven fabric by passing an electric current through the non-woven fabric. Furthermore, it is also possible to provide a flow channel of a refrigerant in the mold (movable mold 12), and heat the non-woven fabric by supplying a heating medium into the flow channel of the refrigerant. In addition, it is also possible to employ a method of embedding an electric heater or the like in the inner part of the mold for heating the mold. It is acceptable to employ pressurized hot water, water vapor or induction heating for heating the mold, but heating by an electric heater is preferable.

When heating the non-woven fabric, a method of heating the non-woven fabric through the mold is effective at preventing the lowering of the temperature of the non-woven fabric, because the mold having a large heat capacity is also heated. This heating method can be easily realized by an active temperature-control system (for instance, described in monthly magazine "Plastics Age", February 2008), which is provided in an injection molding machine and is provided by the present applicant. The active temperature-control system (hereinafter referred to simply as active temperature-control) can supply a cooling medium as well to the flow channel of the refrigerant.

Figure 3:
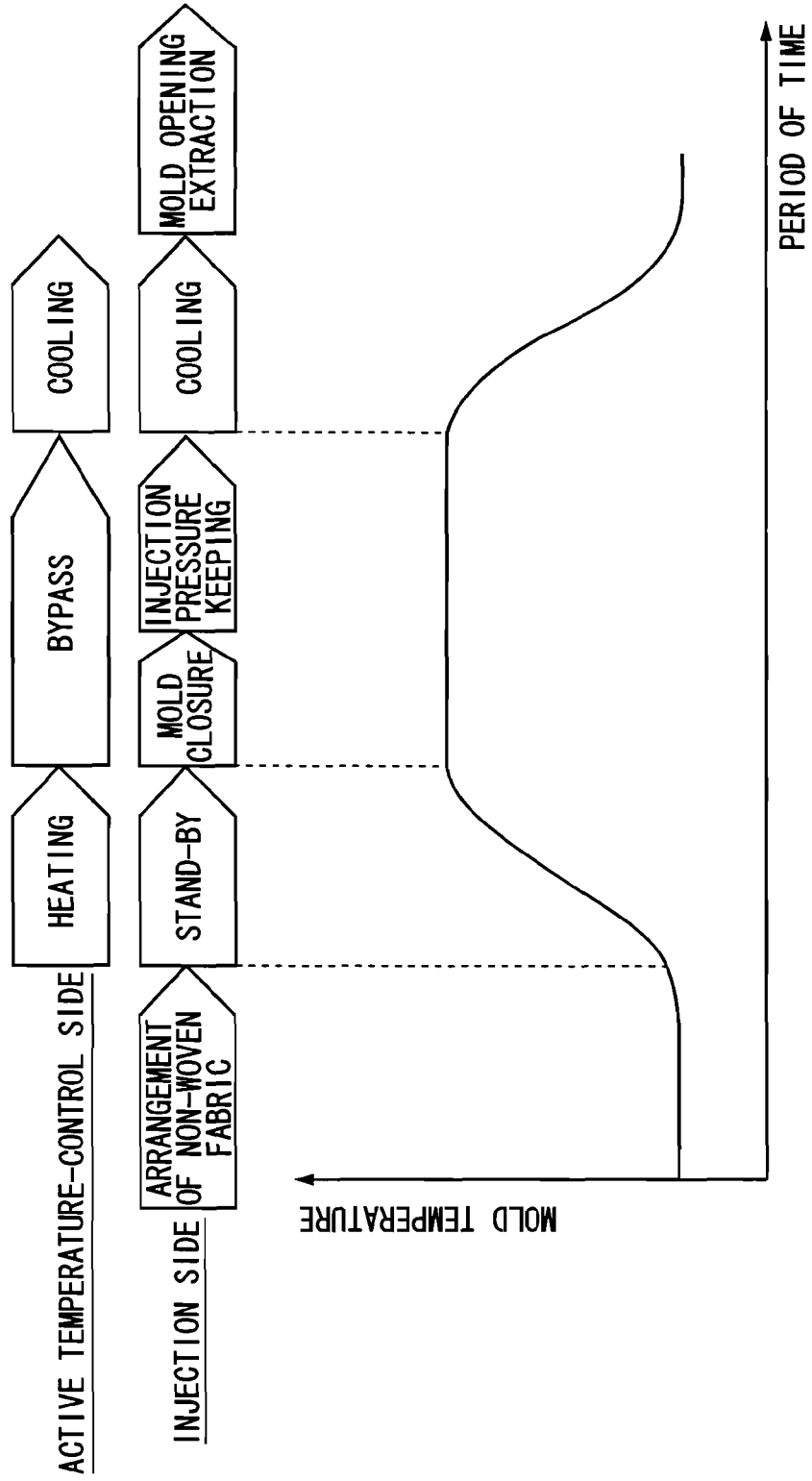
FIG. 3 is a view for describing a procedure of an injection molding process using an active temperature-control.

A procedure of an injection molding process using an active temperature-control will be described below with reference to FIG. 3.

After the non-woven fabric has been placed in the mold cavity, the active temperature-control side is operated. Then, the heating medium is supplied to the flow channel of the refrigerant, and the mold is heated. The non-woven fabric is heated to a desired temperature by heating the mold. During this time, an operation concerning the injection is set to be in a stand-by state. Incidentally, the timing for heating the mold is not limited, and in order to shorten the cycle time of the molding process, the heating of the mold can be started before the non-woven fabric is placed.

When the non-woven fabric has been heated to a predetermined temperature and the preheating process has been finished, the mold is closed (mold closure), the thermoplastic resin is injected into the mold cavity, and the pressure is kept for a predetermined period of time even after the injection has been completed (injection+pressure keeping). During this time, the active temperature-control side does not supply the refrigerant to the mold, by passing the refrigerant into a bypass flow channel which is separately provided. After the preheating operation has been finished, the active temperature-control side switches the medium to be supplied to the cooling medium.

After the pressure keeping operation has been finished, the injection side shifts to a cooling step (cooling). The active temperature-control side forcibly cools the molded composite material by supplying the cooling medium into the flow channel of the refrigerant in the mold.

As described above, it is possible to efficiently and continuously conduct the steps from the step of preheating the non-woven fabric to the step of cooling the non-woven fabric, by using the active temperature-control. Incidentally, the injection compression molding process has not been described here, but it goes without saying that it is effective for making the resin penetrate even the end of the non-woven fabric to combine such an effect that the active temperature-control suppresses the increase in viscosity of the melted resin and enhances the propagation of the pressure with such an effect that the active temperature-control can apply a compression pressure (resin pressure) to the end of a molded article in the injection compression molding operation.

The above described preheating operation can be used for forming the non-woven fabric other than for enhancing the previously described penetrability and the affinity. For instance, when it is desired to obtain a composite material having an arc-shaped cross section, it is preferable to conduct the injection molding operation after having formed (preformed) the non-woven fabric into an arc shape beforehand. In order to preform the non-woven fabric, the non-woven fabric N is heated in a state of being fixed in a three-dimensional preform machine 30 illustrated in FIG. 4. The three-dimensional preform machine 30 is provided with a die plate 31 and a preform mold 32 having a cross section of a semi-cylinder which protrudes from the die plate 31. The die plate 31 and the preform mold 32 are provided with air passages 33. As for the air passages 33, one end of the air passage 33 in the preform mold 32 is connected to a vacuum pump 34, and on the other hand, the other end opens on the surface of the preform mold 32. Accordingly, the non-woven fabric N can be sucked onto the surface of the preform mold 32 by the operated vacuum pump 34. The non-woven fabric N can be preformed by blowing a hot air onto the non-woven fabric N or by directly heating the preform mold 32 in a state of being sucked by and fixed on the preform mold 32.

Figure 4:
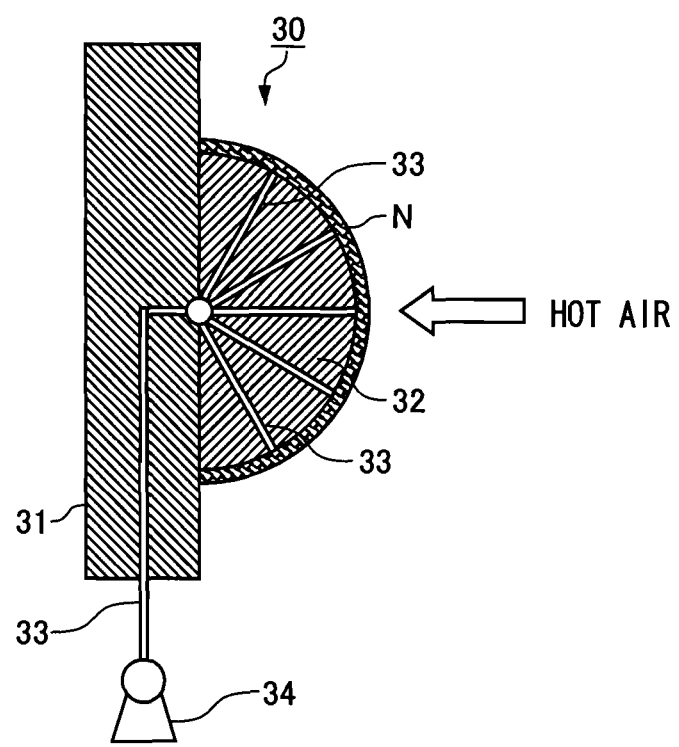
FIG. 4 is a sectional view illustrating a state in which a non-woven fabric is preformed by using a three-dimensional preform mold.

Incidentally, FIG. 4 is based on the premise that the three-dimensional preform machine 30 is provided outside the injection molding machine, but the non-woven fabric can also be preformed in the injection molding machine by using the active temperature-control.

<Foaming Molding Process>

In the present invention, it is preferable to conduct an injection foaming molding process in place of the preheating operation or together with the preheating operation, for the purpose of enhancing the penetrability and the affinity, and enhancing the strength of the fiber-reinforced composite material.

There are known processes of a chemical foaming method of mixing a thermal decomposition type chemical foaming agent such as an azodicarboxylic amide, sodium bicarbonate and citric acid in a thermoplastic resin pellet of a raw material, and a physical foaming method of infusing a gaseous or supercritical physical foaming agent in the middle of a cylinder of the injection molding machine, as a method of conducting the injection foaming molding process, but the present invention can employ both of the methods.

In the present invention, the following functions and effects are expected by employing the injection foaming molding process.

The non-woven fabric has unevenness on the surface, which follows a meandering reinforcement fiber. The thermoplastic resin is hard to infiltrate into the inner part from the surface of the non-woven fabric because the non-woven fabric has the unevenness, but the resin can be forcibly infiltrated into the inner part of the non-woven fabric by a foaming pressure even in the flow end part of the resin, and accordingly the penetrability and the affinity are enhanced.

By lowering the viscosity of the injected resin, the resin is promoted to infiltrate into the inner part of the non-woven fabric, which enhances an anchor effect of the resin with respect to the non-woven fabric. Accordingly, adhesion strength between the non-woven fabric and the resin is enhanced, which contributes to the enhancement of the strength of the fiber-reinforced composite material.

Furthermore, the injection foaming molding process realizes low-pressure injection by lowering the viscosity of the resin to be injected when the injection foaming molding process has been conducted, which suppresses the deviation of the non-woven fabric from the predetermined position and the occurrence of wrinkles in the non-woven fabric when the non-woven fabric is impregnated with the resin. Incidentally, the heating for the mold or the non-woven fabric has not been described here, but it goes without saying that the infiltration of the resin into the inner part of the non-woven fabric is promoted by combining an effect of suppressing the increase in viscosity of the melted resin by heating the mold or the non-woven fabric with an effect of lowering the viscosity of the resin by the injection foaming molding process, and the promoted infiltration of the resin further enhances the anchor effect of the resin with respect to the non-woven fabric.

In the above description, the embodiments of the present invention have been described, but changes can be appropriately made within a range of the scope of the present invention. For instance, an effect of being capable of enhancing an adhesion strength of a thermoplastic resin with respect to the non-woven fabric can be expected by providing a plurality of through holes in a thickness direction of the non-woven fabric. In place of the through hole, a projection may also be provided on the surface of the non-woven fabric.

Next, the present invention will be described below with reference to specific examples.

First Example

Composite materials were produced, which were a non-woven fabric of a carbon fiber impregnated with a thermoplastic resin, by placing the non-woven fabric of the carbon fiber in a mold of an injection molding machine, and conducting injection molding under test conditions shown below. Incidentally, an example in which only a resin was injection-molded without using the non-woven fabric of the carbon fiber was named as Comparative Example 1. In addition, examples were prepared by applying the injection compression molding process to the non-woven fabric on conditions (amount of compression, compression speed and screw position in starting compression) shown in Table 1, concerning the injection molding process. A ratio of screw positions in starting compression in Table 1 is defined by the following expression (1).

A distribution of the thickness of a molded article, a variation of the thickness of the molded article, a weight average fiber length and a tensile strength were evaluated on the obtained composite material. The results are shown in Table 2, FIG. 5 and FIG. 6. Incidentally, the weight average fiber length was obtained by removing the thermoplastic resin in the composite material by heating, and then by randomly extracting 700 to 1,000 carbon fibers therefrom.

$$\text{Ratio of screw positions in starting compression} = 1 - (\text{position in starting compression/position in starting injection}) \qquad (1)$$

[Test Condition]

Molding machine: injection molding machine 450MEII-50 made by MITSUBISHI HEAVY INDUSTRIES PLASTIC TECHNOLOGY CO., LTD.

Mold: flat mold for element test (180×600 mm and 2.0 mm in thickness), central direct gate Non-woven fabric of carbon fiber: non-woven fabric of carbon fiber, basis weight: 200 g/m$^2$, 150×400 mm Non-woven fabric of glass: non-woven fabric of glass fiber, basis weight: 200 g/m$^2$, 150×400 mm Resin: PA6 CM1017 (thermoplastic resin) made by Toray Industries, Inc.

Mold temperature: 80° C.

TABLE 1

|  | Type of non-woven fabric | The number of sheets of non-woven fabric | Injection method | Amount of compression mm | Compression speed mm/sec | Ratio of screw positions in starting compression | Injection speed cc/sec |
|---|---|---|---|---|---|---|---|
| Comparative Example 1 | — | 0 | Ordinary injection | — | — | — | 70 |
| Comparative Example 2 | Carbon fiber | 1 | Ordinary injection | 0 | — | — | 70 |
| Example 1 | Carbon fiber | 1 | Injection compression | 1 | 10 | 0.6 | 70 |
| Example 2 | Carbon fiber | 1 | Injection compression | 2 | 10 | 0.6 | 70 |
| Example 3 | Carbon fiber | 1 | Injection compression | 4 | 10 | 0.6 | 70 |
| Example 4 | Carbon fiber | 1 | Injection compression | 6 | 10 | 0.6 | 70 |
| Example 5 | Carbon fiber | 1 | Injection compression | 1 | 10 | 0.7 | 70 |
| Example 6 | Carbon fiber | 1 | Injection compression | 2 | 10 | 0.7 | 70 |
| Example 7 | Carbon fiber | 1 | Injection compression | 4 | 10 | 0.7 | 70 |
| Example 8 | Carbon fiber | 1 | Injection compression | 6 | 10 | 0.7 | 70 |

TABLE 2

|  | Distribution of thickness of molded article mm | Variation of thickness of molded article mm | Weight average fiber length mm | Tensile strength MPa |
|---|---|---|---|---|
| Comparative Example 1 | 1.96-2.03 | 0.07 | — | 50 |
| Comparative Example 2 | 1.96-2.05 | 0.09 | 3 | 120 |
| Example 1 | 1.90-2.07 | 0.17 | 8 | 203 |
| Example 2 | 1.90-2.09 | 0.19 | 9 | 218 |
| Example 3 | 1.85-2.18 | 0.33 | 6.3 | 169 |
| Example 4 | 1.85-2.26 | 0.41 | 5 | 141 |
| Example 5 | 1.88-2.12 | 0.24 | 7.6 | 192 |
| Example 6 | 1.88-2.16 | 0.28 | 8.5 | 208 |
| Example 7 | 1.85-2.22 | 0.37 | 5.8 | 160 |
| Example 8 | 1.83-2.31 | 0.48 | 4.6 | 140 |

Figure 5:
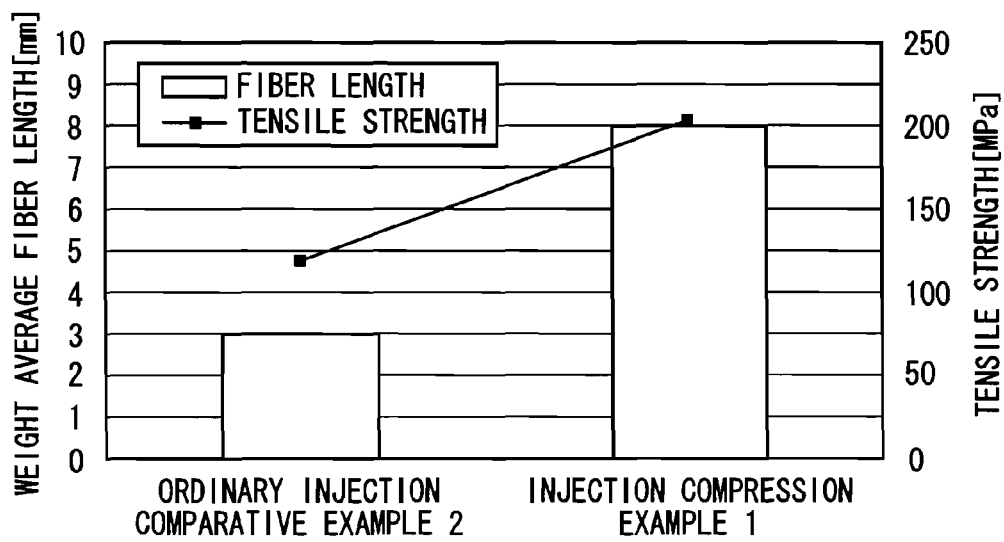
FIG. 5 is a graph illustrating a result of having evaluated a weight average fiber length and a tensile strength of a fiber-reinforced composite material (Comparative Example 2 and Example 1) obtained in the first Example.
Figure 6:
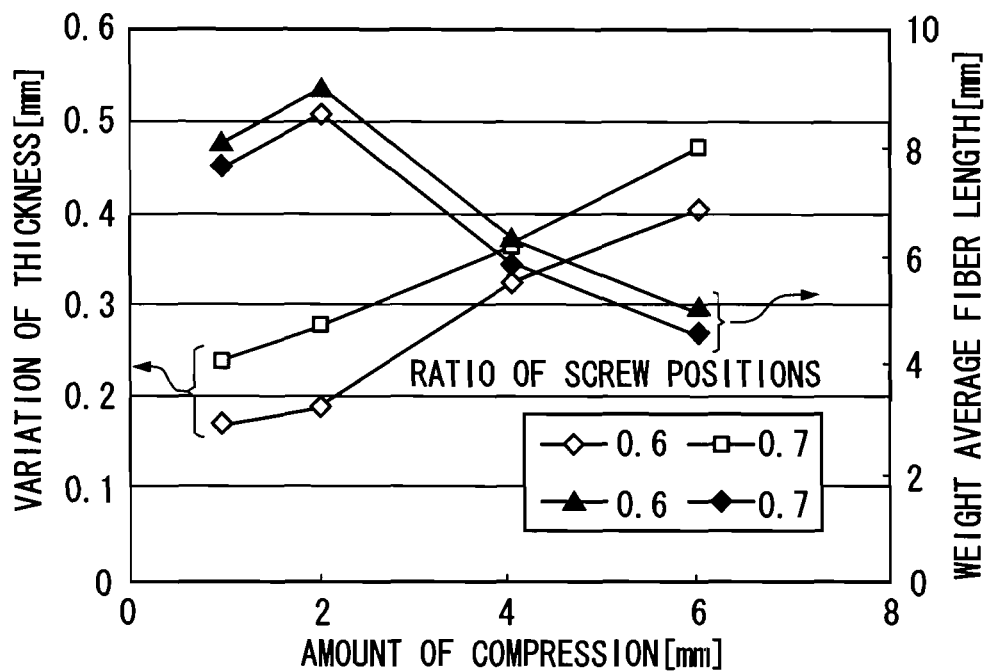
FIG. 6 is a graph illustrating a relationship between the variation of the thickness and the weight average fiber length with respect to the amount of compression, on the fiber-reinforced composite material obtained in the first Example.

The followings are understood from the results shown in Table 2, FIG. 5 and FIG. 6.

The tensile strength of the composite material can be remarkably enhanced in comparison with that of the thermoplastic resin, by impregnating the non-woven fabric of the carbon fiber with the thermoplastic resin by the injection molding process.

In addition, the tensile strength of the composite material can be more enhanced by employing the injection compression molding process than employing an ordinary injection molding process. This enhancement is based on that the length of the carbon fiber in the composite material produced by the injection compression molding process is longer than that of the injection compression molding process. In other words, a pressure is applied to a non-woven fabric of fiber while the injection molding process including the injection compression molding process is conducted, and accordingly some carbon fibers out of the carbon fibers constituting the non-woven fabric are broken and become shorter than the initial one. However, in the injection compression molding process, the pressure in the molding process is lower compared to that in ordinary compression (for instance, 2 to 50 MPa, preferably 2 to 30 MPa, and further preferably 2 to 20 MPa), and accordingly a breakage degree of the carbon fibers becomes slighter than that in the ordinary injection molding process. As a result, the length of the carbon fiber in the composite material becomes longer than that by the ordinary injection molding process, and the tensile strength becomes higher.

Next, as is illustrated in FIG. 6, the variation of the thickness and the weight average fiber length of the composite material vary according to the amount of compression in the injection compression molding. In other words, as the amount of compression increases, the variation of the thickness of the composite material increases. On the other hand, the weight average fiber length shows the peak when the amount of compression is 2 mm. From this result, when a composite material with high strength is produced so as to have high precision, the amount of compression is preferably set at approximately 1 to 3 mm. Incidentally, it is understood that the reason why the amount of compression shows the peak as described above is because an action of breaking the fiber is different according to the amount of compression. In other words, when the amount of compression increases, the fiber is broken by the increase of the deformation amount of the resin in the compression operation. On the other hand, when the amount of compression decreases, the flowing velocity of the resin increases as the flow channel through which the resin flows becomes narrower, and a large shearing stress is generated to break the fiber.

Second Example

Figure 7:
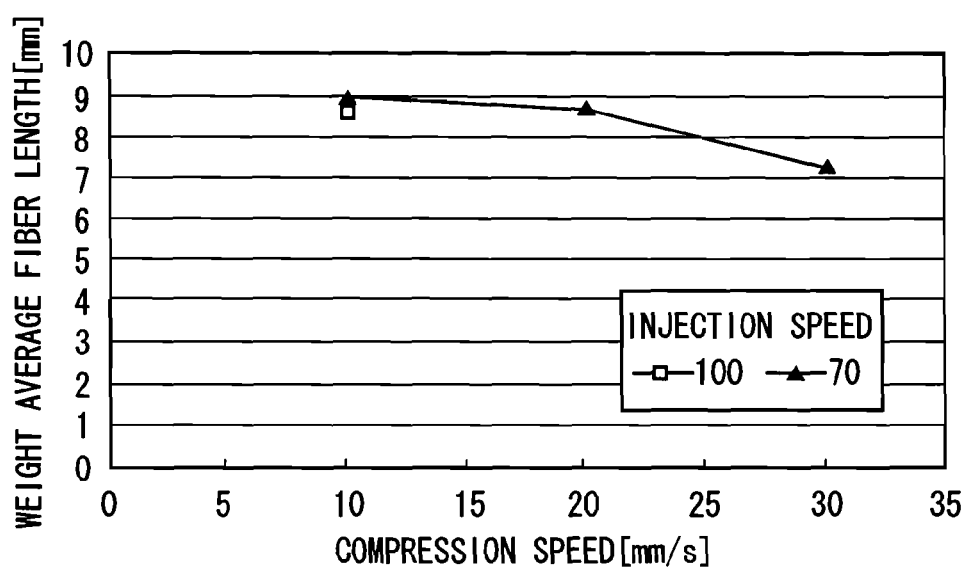
FIG. 7 is a graph illustrating a relationship between the weight average fiber length and a compression speed and an injection molding process in the second Example.

Composite materials were produced in a similar way to that in injection compression molding in the first Example, except that a compression speed in the injection compression molding process and an injection speed in the injection molding process were set at values shown in Table 3. The obtained composite materials were evaluated in a similar way to that in the first Example. The results are shown in Table 4 and FIG. 7.

TABLE 3

|  | Type of non-woven fabric | The number of sheets of non-woven fabric | Injection method | Amount of compression mm | Compression speed mm/sec | Ratio of screw positions in starting compression | Injection speed cc/sec |
|---|---|---|---|---|---|---|---|
| Example 2 | Carbon fiber | 1 | Injection compression | 2 | 10 | 0.6 | 70 |
| Example 9 | Carbon fiber | 1 | Injection compression | 2 | 20 | 0.6 | 70 |

TABLE 3-continued

| | Type of non-woven fabric | The number of sheets of non-woven fabric | Injection method | Amount of compression mm | Compression speed mm/sec | Ratio of screw positions in starting compression | Injection speed cc/sec |
|---|---|---|---|---|---|---|---|
| Example 10 | Carbon fiber | 1 | Injection compression | 2 | 30 | 0.6 | 70 |
| Example 11 | Carbon fiber | 1 | Injection compression | 2 | 10 | 0.6 | 100 |

TABLE 4

| | Distribution of thickness of molded article mm | Variation of thickness of molded article mm | Weight average fiber length mm | Tensile strength MPa |
|---|---|---|---|---|
| Example 2 | 1.90-2.09 | 0.19 | 9 | 218 |
| Example 9 | 1.92-2.12 | 0.2 | 8.8 | 214 |
| Example 10 | 1.92-2.11 | 0.19 | 7.4 | 189 |
| Example 11 | 1.91-2.11 | 0.2 | 8.6 | 218 |

As the compression speed increases, the fiber length tends to be shortened. Among the tested conditions (compression speeds), when the compression speed was 10 mm/s, the weight average fiber length became the longest.

In addition, as for the influence of the weight average fiber length by the injection speed, significant difference is not observed between 70 cc/sec and 100 cc/sec.

Third Example

In order to enhance the affinity of a fiber constituting the non-woven fabric for a thermoplastic resin, an effect of preheating the non-woven fabric was examined.

Figure 8:
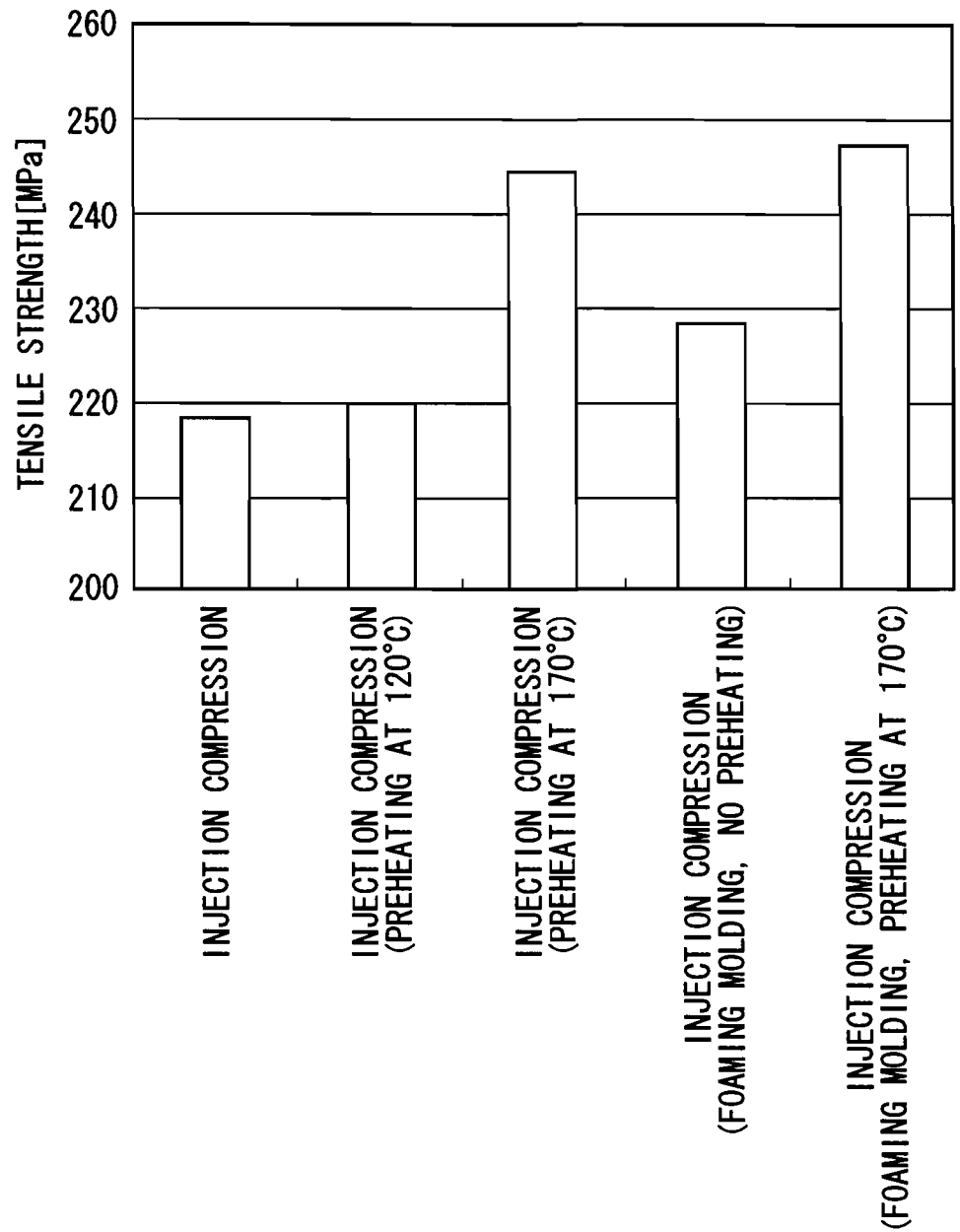
FIG. 8 is a graph illustrating a relationship between various moldings and a tensile strength of the obtained fiber-reinforced composite material in the third Example.

Composite materials were produced in a similar way to that in the injection compression molding in the first Example, except that the non-woven fabric of the carbon fiber was heated (preheating) before the injection molding operation started or the foaming molding process was conducted on conditions shown in Table 5. The obtained composite materials were evaluated in a similar way to that in the first Example. The results are shown in Table 6 and FIG. 8.

For information, the foaming molding process is a process of mixing a chemical foaming agent (sodium bicarbonate-based chemical foaming agent, foaming agent EE205D made by EIWA CHEMICAL IND. CO., LTD.) in an amount of 2 wt % with a thermoplastic resin of a raw material, charging the mixture into a hopper of an injection molding machine, mixing and plasticizing the mixture with a screw, and injecting the resultant mixture into a mold through a nozzle of the injection molding machine. In addition, preheating was conducted by two methods of: heating the non-woven fabric of the carbon fiber placed at a predetermined position in the mold with a hot air; and heating the non-woven fabric of the carbon fiber through the mold by the previously described active temperature-control.

TABLE 5

| | Type of non-woven fabric | The number of sheets of non-woven fabric | Injection method | Amount of compression mm | Compression speed mm/sec | Ratio of screw positions in starting compression | Injection speed cc/sec | Use or no use of foaming molding | Preheating method Hot-air heating | Preheating method Active temperature-control |
|---|---|---|---|---|---|---|---|---|---|---|
| Example 2 | Carbon fiber | 1 | Injection compression | 2 | 10 | 0.6 | 70 | Unused | Unused | Unused |
| Example 12 | Carbon fiber | 1 | Injection compression (preheating at 120° C.) | 2 | 10 | 0.6 | 70 | Unused | 120° C. | Unused |
| Example 13 | Carbon fiber | 1 | Injection compression (preheating at 170° C.) | 2 | 10 | 0.6 | 70 | Unused | Unused | 170° C. |
| Example 14 | Carbon fiber | 1 | Injection compression (foaming molding, no preheating) | 2 | 10 | 0.6 | 70 | Used | Unused | Unused |
| Example 15 | Carbon fiber | 1 | Injection compression (foaming molding, preheating at 170° C.) | 2 | 10 | 0.6 | 70 | Used | Unused | 170° C. |

TABLE 6

| | Distribution of thickness of molded article mm | Variation of thickness of molded article mm | Weight average fiber length mm | Tensile strength MPa |
|---|---|---|---|---|
| Example 2 | 1.90-2.09 | 0.19 | 9 | 218 |
| Example 12 | 1.92-2.09 | 0.17 | 9.2 | 220 |
| Example 13 | 1.94-2.08 | 0.14 | 9.8 | 245 |
| Example 14 | 1.93-2.10 | 0.17 | 9.6 | 229 |
| Example 15 | 1.95-2.05 | 0.1 | 9.9 | 248 |

As a result, it was confirmed that a tensile strength was enhanced by preheating the non-woven fabric before conducting the injection molding operation. However, as for the preheating method, the method using the active temperature-control resists lowering the temperature of the non-woven fabric of the carbon fiber because the active temperature-control can conduct preheating at a higher temperature and besides the mold itself is heated and becomes hot. The reason why the tensile strength of the composite material produced by using the active temperature-control was high is understood to be because the injection molding was conducted while the affinity of the non-woven fabric of the carbon fiber for the thermoplastic resin was kept high according to the above mechanism. In addition, the tensile strength of the composite material can be enhanced also by employing the foaming molding process because the affinity of the non-woven fabric of the carbon fiber for the thermoplastic resin is enhanced. Particularly, the example (Example 15) prepared by combining the active temperature-control with the foaming molding process reduced the variation of the thickness and showed a high tensile strength because the combination facilitated the thermoplastic resin to flow and resisted cooling the thermoplastic resin.

Fourth Example

As shown in Table 7, the composite materials were produced with the use of a non-woven fabric of glass fiber in a similar way to that in injection compression molding in the first Example. The obtained composite materials were evaluated in a similar way to that in the first Example. The results are shown in Table 8. It was confirmed that the strength of the composite material was enhanced in the non-woven fabric using glass fiber as well as that using the carbon fiber.

TABLE 7

|  | Type of non-woven fabric | The number of sheets of non-woven fabric | Injection method | Amount of compression mm | Compression speed mm/sec | Ratio of screw positions in starting compression | Injection speed cc/sec |
| --- | --- | --- | --- | --- | --- | --- | --- |
| Comparative Example 1 | — | 0 | Ordinary injection | — | — | — | 70 |
| Example 2 | Carbon fiber | 1 | Injection compression | 2 | 10 | 0.6 | 70 |
| Example 16 | Glass fiber | 1 | Injection compression | 2 | 10 | 0.6 | 70 |

TABLE 8

|  | Distribution of thickness of molded article mm | Variation of thickness of molded article mm | Weight average fiber length mm | Tensile strength MPa |
| --- | --- | --- | --- | --- |
| Comparative Example 1 | 1.96-2.03 | 0.07 | — | 50 |
| Example 2 | 1.90-2.09 | 0.19 | 9 | 218 |
| Example 16 | 1.92-2.09 | 0.19 | 7 | 138 |

Fifth Example

A relation between the temperature of a mold and the flowability of a resin was studied.

Composite materials were produced in a similar way to that in Example 2 of the first Example, except that the injection compression molding was conducted after the temperature of the mold reached the temperature shown in Table 9. The tensile strength of the obtained composite materials was measured in a similar way to that in the first Example. The result is shown in Table 9. In the fifth Example, only the mold was heated and heating by hot air was omitted.

TABLE 9

|  | Injection method | Mold temperature °C. | Injection pressure MPa | Tensile strength MPa | Active temperature-control |
| --- | --- | --- | --- | --- | --- |
| Example 2 | Injection compression | 80 | 50 | 218 | Unused |
| Example 17 | Injection compression | 120 | 25 | 230 | Used |
| Example 18 | Injection compression | 150 | 22 | 240 | Used |
| Example 19 | Injection compression | 180 | 17 | 250 | Used |
| Example 20 | Injection compression | 210 | 15 | 250 | Used |

As shown in Table 9, as the temperature of the mold rose, the strength of the composite material was enhanced. Accordingly, it was confirmed that it was effective to conduct the injection compression molding in a state of having heated the mold to a predetermined temperature, in order to obtain the composite material having a high strength.

Table 9 shows also an injection pressure (pressure applied to an entrance of a cavity when the melted thermoplastic resin was injected and the impregnation was completed (when end pressure was 0)). It was possible to conduct the injection compression molding with a lower injection pressure as the mold temperature became higher. In other words, it was confirmed that the flowability of the resin was enhanced by heating the mold. It is considered that the enhanced flowability of the resin elongated a weight average fiber length, and as a result, the strength of the composite material was enhanced. In addition, as for the appearance of the molded article, a glossy and high appearance quality was obtained. This is considered to be because the resin permeated into the non-woven fabric, filled the non-woven fabric up to the outer surface and entered between the mold and the non-woven fabric to cover the surface of the non-woven fabric, and also the mold transfer property of the outer surface of the molded article was enhanced due to the high temperature of the mold surface itself.

A melting point of the used thermoplastic resin (PA6 made by Toray Industries, Inc. CM1017) is 225° C. Considering that the injection pressure decreased when the temperature of the mold was 120° C. or higher, it is preferable to set the mold temperature as follows.

melting point of thermoplastic resin−75° C.≦temperature of mold

However, because the deterioration of the melt resin progresses when the temperature of the mold becomes too high, it is preferable to set the upper limit of the temperature of the mold as follows.

temperature of mold melting point of thermoplastic resin+50° C.

The range of a more preferable temperature of the mold is as follows.

melting point of thermoplastic resin−50° C.≤temperature of mold melting point of thermoplastic resin+50° C.

In addition, when Example 19 (temperature of mold was 180° C.) is compared with Example 20 (temperature of mold was 210° C.), the values of the tensile strengths of both Examples are the same. In order to fully receive the effect of enhancing the flowability of the resin by heating the mold while suppressing the increase of a cost associated with the heating of the mold, it is more preferable to set the range of the temperature of the mold as follows.

melting point of thermoplastic resin−50° C.≤temperature of mold melting point of thermoplastic resin Sixth Example In Examples 13, 15 and 17 to 20, both a fixed mold and a movable mold in which the non-woven fabric was to be placed were heated by the active temperature-control. On the other hand, in the sixth Example, an effect of heating only one of the fixed mold and the movable mold was confirmed. In the sixth Example, only the mold was heated and the heating with a hot air was omitted.

Composite materials were produced in a similar way to that in Example 15 (through foaming molding process) or Example 13 (through no foaming molding process) of the third Example, except that the injection compression molding was conducted after only one of the fixed mold and the movable mold was heated. The obtained composite materials were evaluated in a similar way to that in the first Example. The results are shown in Table 10.

TABLE 10

| | Use or no use of foaming molding | Active temperature-control | Distribution of thickness of molded article mm | Variation of thickness of molded article mm | Weight average fiber length mm | Tensile strength MPa |
|---|---|---|---|---|---|---|
| Example 2 | Unused | Unused | 1.90-2.09 | 0.19 | 9 | 218 |
| Example 14 | Used | Unused | 1.93-2.10 | 0.17 | 9.6 | 229 |
| Example 15 | Used | 170° C. (heating of both movable mold and fixed mold) | 1.95-2.05 | 0.1 | 9.9 | 248 |
| Example 21 | Used | 170° C. (heating of only fixed mold) | 1.93-2.06 | 0.13 | 9.8 | 243 |
| Example 22 | Unused | 170° C. (heating of only fixed mold) | 1.91-2.06 | 0.15 | 9.2 | 222 |
| Example 23 | Unused | 170° C. (heating of only movable mold) | 1.91-2.06 | 0.15 | 9.4 | 225 |

As shown in Table 10, also in the case in which the injection compression molding was conducted after only one of the fixed mold and the movable mold was heated, the effect could be obtained that was equivalent to the case in which both of the fixed mold and the movable mold were heated.

REFERENCE SIGNS LIST

10 . . . Injection molding machine, 11 . . . Fixed mold, 12 . . . Movable mold, 13 . . . Cavity, 17 . . . Injection cylinder 20 . . . Fixing mechanism, 22 . . . Fixing pin, 23 . . . Actuating column 30 . . . Three-dimensional preform machine, 32 . . . Preform mold

The invention claimed is:

1. A method for manufacturing the fiber-reinforced composite material comprising:

a step (a) of placing a non-woven fabric formed of a reinforcement fiber in a mold; and a step (b) of injecting a thermoplastic resin into the mold to obtain a molded article formed of the non-woven fabric and the thermoplastic resin, wherein an injection compression molding process is conducted as the injection molding process in the step (b), further comprising:

heating the non-woven fabric in the step (a); and then conducting the injection compression molding process in the step (b), wherein the mold on which the non-woven fabric has been placed and the mold on which the non-woven fabric is not placed are heated so that the heating speeds are different from each other, and wherein only the non-woven fabric is used as a skin material.

2. A method for manufacturing the fiber-reinforced composite material comprising:

a step (a) of placing a non-woven fabric formed of a reinforcement fiber in a mold; and a step (b) of injecting a thermoplastic resin into the mold to obtain a molded article formed of the non-woven fabric and the thermoplastic resin, wherein an injection compression molding process is conducted as the injection molding process in the step (b), further comprising:

heating the non-woven fabric in the step (a); and then conducting the injection compression molding process in the step (b), wherein the mold on which the non-woven fabric has been placed and the mold on which the non-woven fabric is not placed are heated so that the temperatures are different from each other, and wherein only the non-woven fabric is used as a skin material.

3. A method for manufacturing a fiber-reinforced composite material comprising:

a step (a) of placing a non-woven fabric consisting essentially of a reinforcement fiber in a mold, the amount of fiber per unit area of the non-woven fabric being selected from a range of 40 to 500 g/m²; and a step (b) of injecting a thermoplastic resin into the mold to obtain a molded article formed of the non-woven fabric and the thermoplastic resin, wherein an injection compression molding process is conducted as the injection molding process in the step (b), and an amount of compression in the injection molding process is set at 1 to 3 mm, and wherein only the non-woven fabric is used as a skin material.

4. The method for manufacturing the fiber-reinforced composite material according to claim 3, further comprising:

heating the non-woven fabric in the step (a); and then conducting the injection compression molding process in the step (b).

5. The method for manufacturing the fiber-reinforced composite material according to claim 4, wherein the reinforcement fiber comprises a carbon fiber, the non-woven fabric is induction-heated by passing an eddy current through the non-woven fabric.

6. The method for manufacturing the fiber-reinforced composite material according to claim 4, wherein the reinforcement fiber comprises a carbon fiber, the non-woven fabric is resistance-heated by passing an electric current through the non-woven fabric.

7. The method for manufacturing the fiber-reinforced composite material according to claim 3, further comprising:

heating at least one part of the mold in the step (a); and then conducting the injection compression molding process in the step (b).

8. The method for manufacturing the fiber-reinforced composite material according to claim 3, wherein the reinforcement fiber comprises a carbon fiber or a glass fiber.

9. The method for manufacturing the fiber-reinforced composite material according to claim 3, wherein a compression speed in the injection molding process is set in a range of 5 to 15 mm/sec.

10. A method for manufacturing a fiber-reinforced composite material according to claim 3, wherein a thermal decomposition type chemical foaming agent is mixed with the thermoplastic resin, or a gaseous or supercritical physical foaming agent is infused into the thermoplastic resin in the middle of a cylinder of an injection molding machine, wherein an injection compression molding process is conducted as the injection molding process in the step (b).

11. A method for manufacturing a fiber-reinforced composite material according to claim 3, the mold including a movable mold and a fixed mold, comprising:

a step (a) of placing a non-woven fabric formed of a reinforcement fiber in the movable mold; and a step (b) of injecting a thermoplastic resin into the mold to obtain a molded article formed of the non-woven fabric and the thermoplastic resin, wherein an injection compression molding process is conducted as the injection molding process in the step (b).

\* \* \* \* \*